Dec. 8, 1959 C. L. WANLASS 2,916,636

CURRENT FEEDBACK MULTIVIBRATOR UTILIZING TRANSISTORS

Filed Aug. 9, 1955 2 Sheets-Sheet 1

INVENTOR.
CRAVENS L. WANLASS
BY
[signature]
[signature]
ATTORNEYS

CURRENT FEEDBACK MULTIVIBRATOR UTILIZING TRANSISTORS

Filed Aug. 9, 1955 2 Sheets-Sheet 2

INVENTOR.
CRAVENS L. WANLASS
BY
ATTORNEYS 2,916,636
Patented Dec. 8, 1959

2,916,636

CURRENT FEEDBACK MULTIVIBRATOR UTILIZING TRANSISTORS

Cravens L. Wanlass, Whittier, Calif., assignor, by mesne assignments, to Thompson Ramo Wooldridge Inc., Cleveland, Ohio, a corporation of Ohio Application August 9, 1955, Serial No. 527,191

5 Claims. (Cl. 307—88.5)

Figure 1:
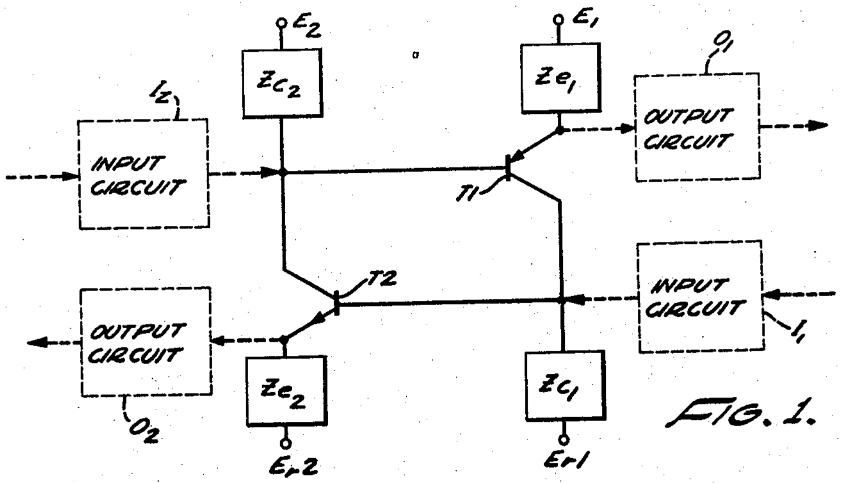

This invention relates to a current feedback flip-flop utilizing transistors and, more particularly, to a circuit of this type wherein high stability is achieved, in addition to high-speed trigger response, improved pulse sensitivity, and improved power-supplying capacity.

In most of the previously devised transistor flip-flop circuits, or so-called bistable multivibrator circuits, the two-state characteristic of the circuit is achieved by operating the transistors in their negative resistance regions of conductance. This is achieved in the case of a point-contact transistor by connecting a relatively high impedance in series with the base of the transistor, resulting in a regeneration effect. Thus typically the applicable patents in this field show the negative resistance characteristic as, for example, is done in Figs. 2, 3; 2, 6; 2, 5; 3–6, shown respectively in Patents 2,579,336 to A. J. Rack; 2,614,140 to J. G. Kreer, Jr.; 2,614,142 to J. O. Edson; and 2,622,212 to A. E. Anderson et al.

In a similar manner the negative resistance characteristic is utilized in the following patents: 2,531,076 to R. P. Moore, Jr.; 2,533,001 to E. Eberhard; 2,591,961 to R. P. Moore, Jr., et al.; 2,594,336 to M. E. Mohr; 2,644,892 and 2,644,893 to J. B. Gehman; and 2,644,896 and 2,644,897 to A. W. Lo.

The transistor bistable elements described in these patents provide but a single stable-state representing signal. And, consequently, it is frequently necessary to add additional circuits in order to obtain the complement of a signal as may be obtained through the cross-coupled amplifier type of circuit. This means, therefore, that any theoretical advantage in simplicity in the single transistor flip-flop is lost where complementary signals are required.

Trigger circuits utilizing this negative resistance function are highly sensitive to changes in circuit parameters and the above-described patents are primarily concerned with improved arrangements for making the circuits less sensitive to such parameter changes. However, the operation of even these improved circuits has still proved to be somewhat marginal and reliability is achieved only at the expense of rather complicated circuit arrangements.

A further limitation inherent in the conventional technique is the employment of voltage feedback where a relatively low impedance source point on each of the transistors is utilized to control the condition of the other transistor through a high impedance input circuit. Effectively, the conventional voltage feedback technique is a direct equivalent of the well-known Eccles-Jordan trigger circuit employing vacuum tubes where the anode circuit of each vacuum tube provides a low impedance source which is coupled to the high impedance grid control circuit of the other tube.

It will be shown herein in the detailed description which follows that the voltage feedback technique is inherently self-limiting with respect to the range of voltage changes which may be allowed between the two stable states. As a result the stability of the voltage feedback arrangement is greatly limited since such stability is a function of the voltage difference between the two stable state conditions. The effect of the limitation upon stability may also be recognized by noting that where the voltage change between two states is small, noise or other transient signals may reach the voltage difference level and cause spurious triggering of the circuit.

Furthermore, the conventional bistable circuit arrangement has limited utility with respect to the amount of load current or power it can supply. One reason for this is that in a voltage feedback arrangement a heavy load may reduce the voltage difference between the two stable state conditions so that at best the circuit becomes unreliable in operation if not completely unstable.

In addition to this, the fact that the voltage feedback arrangement specifies a high input impedance control circuit means that the frequency response or pulse triggering range is somewhat limited.

The present invention obviates these and other disadvantages which are inherent in the prior art by providing a transistor flip-flop wherein a two-state current characteristic is achieved through a current feedback arrangement where the difference in current conduction states may vary in the order of $10^9$ to 1, as compared to a typical voltage feedback arrangement which may provide a voltage variation of 10 to 1. The current feedback technique, furthermore, allows a low impedance input circuit with the result that the flip-flop has a rapid pulse response, and at the same time allows a high trigger sensitivity.

The invention thus allows true current triggering for a transistor flip-flop. In addition, since stability is achieved without a common emitter biasing arrangement such as is found in the patent to Anderson et al. mentioned above, it is also unnecessary to utilize a large voltage pulse. Thus the speed of operation is enhanced by avoiding the effects of distributed capacity.

In its general circuit configuration the invention comprises two transistors of opposite conductivity type (i.e. one is NPN and the other PNP). The collector of each transistor is connected to the base of the other providing a series current feedback arrangement. Each collector is provided with a load impedance of relatively high value, whereas each emitter is provided with a load impedance of relatively low value; ensuring a stable arrangement where the highly conducting condition of one transistor results in the forward biasing and highly conducting condition of the other transistor. The collector to emitter load impedance ratio is made large to provide a stability safety factor.

Trigger signals then are applied to one of the base-to-collector junctions between the transistors and across the corresponding collector load resistor, signals of one polarity being effective to drive the circuit into a high conduction state and signals of the opposite polarity being effective to cut off conduction and leave the circuit in a low conduction state.

An interesting and important distinction to be noted between the current feedback flip-flop of the present invention and the voltage feedback flip-flop, which is common in the art is that in one state the current feedback flip-flop exhibits high conduction in both transistors and in the other in neither of the transistors; whereas in the voltage feedback flip-flop the transistors are always in opposite states of conductivity.

Accordingly, it is an object of the present invention to provide a transistor flip-flop circuit having a high degree of current stability.

Another object of the invention is to provide a transistor trigger circuit having high pulse sensitivity.

A further object is to provide a transistor flip-flop having a fast acting pulse response.

Yet a further object is to provide a flip-flop employing transistors arranged in a current feedback circuit where stability is achieved without the necessity of utilizing the negative resistance characteristic of the transistors, thereby obviating the necessity of accurately regulating the circuit parameters.

Still a further object is to provide a highly stable current feedback flip-flop which is relatively insensitive to circuit parameter changes while at the same time being highly sensitive to trigger pulses.

A more specific object is to provide a current feedback transistor circuit having high stability, pulse sensitivity, a low pulse response time, and the ability to provide a high load current.

Another specific object of the invention is to provide a current feedback transistor flip-flop wherein two transistors are employed having their collectors and bases cross-coupled, one base-collector junction receiving trigger input signals; the emitter of each transistor then including a relatively low impedance load resistor and the collector thereof including a relatively high impedance load resistor.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figure 2A:
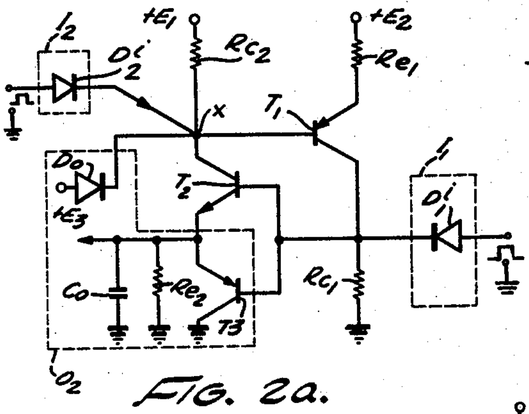
Figure 2B:
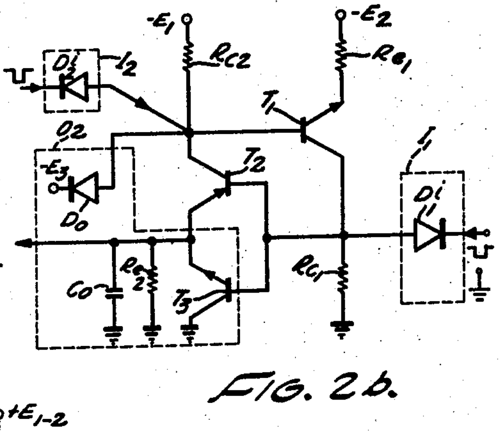
Figure 3:
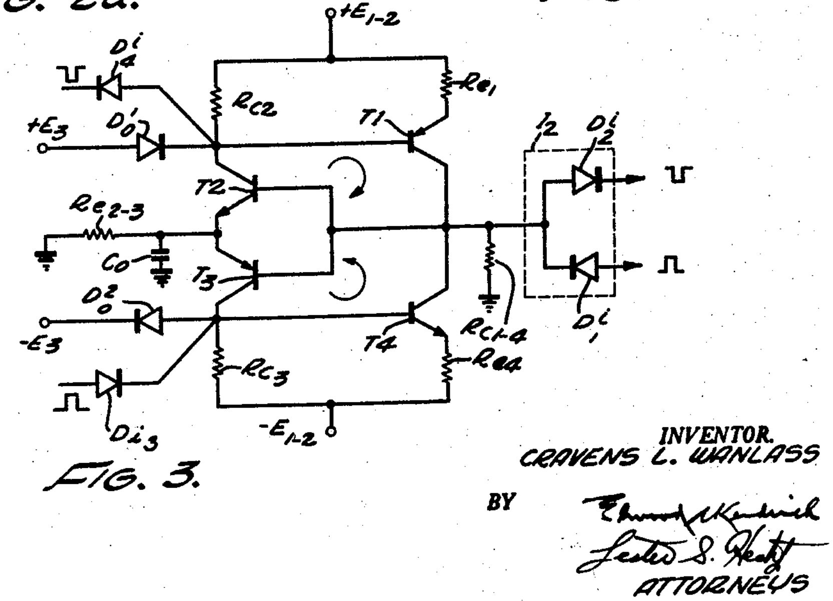
Figure 4:
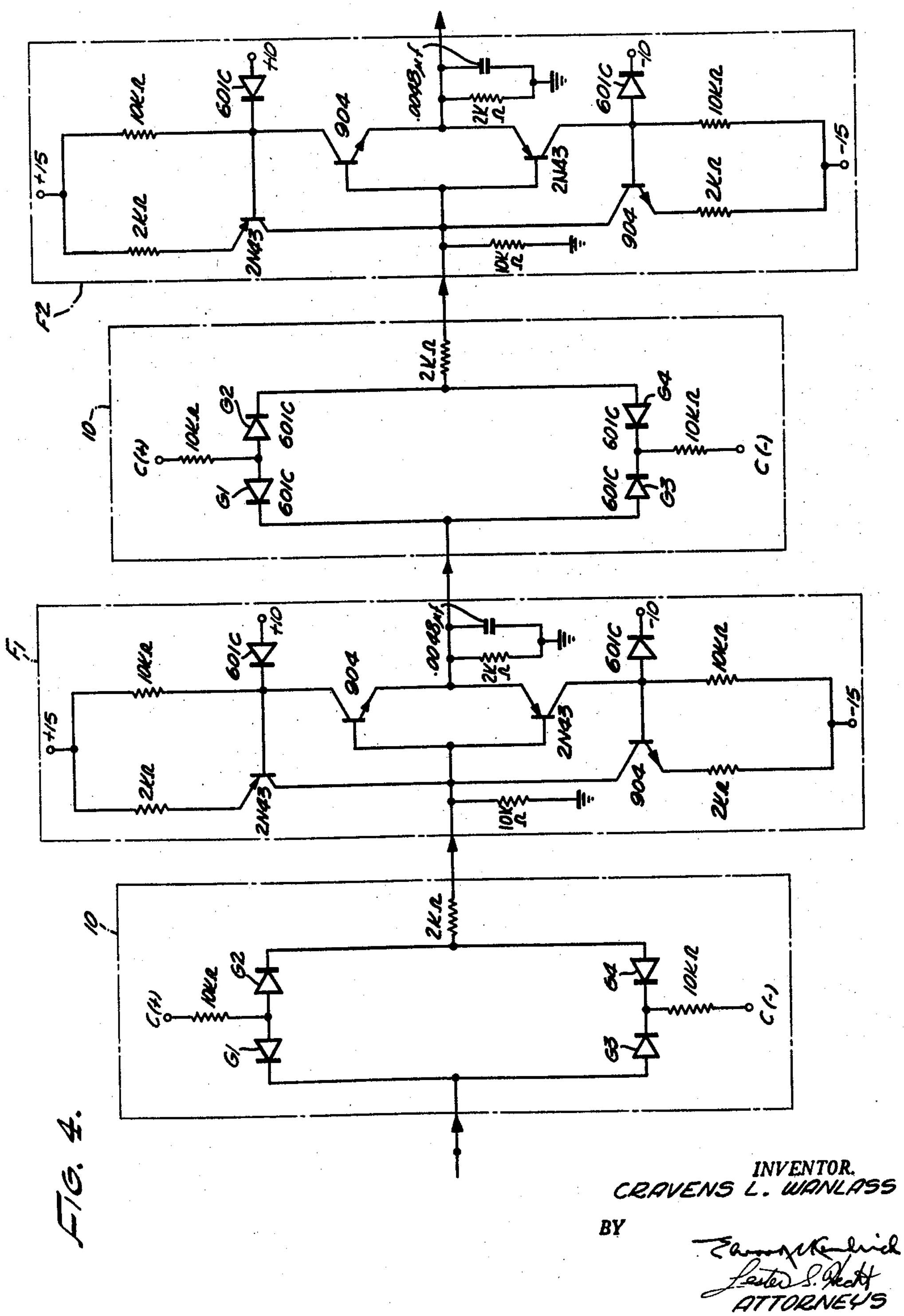

Fig. 1 is a block diagram illustrating the general form of the invention;

Figs. 2*a* and 2*b* illustrate two species of the invention indicating the association therewith of output storage circuits;

Fig. 3 is a schematic diagram of a double current-feedback transistor flip-flop allowing an improvement in trigger pulse sensitivity; and Fig. 4 is a schematic diagram of a shifting register employing two flip-flops of the type shown in Fig. 3.

Reference is now made to Fig. 1 wherein the general arrangement of the present invention is shown in block diagram form. As indicated in Fig. 1 a current feedback multivibrator is provided wherein transistors T1 and T2 of opposite conductivity type are connected in current series, where the base electrode of T1 is connected to collector electrode of T2 and the base electrode of T2 is connected to the collector electrode of T1.

The emitter electrode of T1 receives a source potential $E_1$ through an emitter impedance $Ze_1$, and the emitter electrode of T2 receives a reference potential $Er_2$ through an impedance $Ze_2$.

A collector impedance $Zc_1$ is provided for $T_1$ and receives a reference potential $Er_1$; and, in a similar manner, a collector impedance $Zc_2$ is coupled to the collector of transistor $T_2$ and receives a source potential $E_2$.

Stability considerations which will be discussed further below dictate that the load impedances be defined by the inequality function: $Ze_1 \ll Zc_1$ and $Ze_2 \ll Zc_2$. When the operation of the circuit is considered it will be apparent that these relationships ensure a feedback current gain so that the circuit will be stabilized in either a highly conducting state where both of transistors $T_1$ and $T_2$ are conducting, or a lowly conducting state where both of the transistors are substantially cut off.

The reference potentials are selected so that $E_1$ is sufficiently greater than $Er_1$ to forward bias transistor $T_1$ during the conducting state of the circuit and potential $E_2$ is sufficiently greater than potential $Er_2$ to forward bias transistor $T_2$. When silicon transistors are employed, potential $E_2$ may be equal to $E_1$ and potential $Er_2$ may be equal to $Er_1$, typical values being fifteen volts for $E_2$ and $E_1$ and ground potential for $Er_1$ and $Er_2$. However, when germanium transistors are employed, it may be necessary to back bias the transistors slightly to maintain the flip-flop circuit in the non-conducting state. In this case, potential $E_2$ is made to be greater than $E_1$ to back bias transistor $T_1$ during its non-conducting state and potential $Er_2$ is selected to be greater than potential $Er_1$.

As indicated in Fig. 1 two basic input circuit possibilities are present, namely an input circuit $I_1$ providing an actuating signal for transistor $T_2$, being coupled to the base thereof; and an input circuit $I_2$ coupled to the base of transistor $T_1$; where transistor $T_1$ is a PNP as illustrated it may be triggered into conduction by the application of a negative pulse to the base or may be cut off from conduction by application of a positive pulse thereto. In a similar manner where $T_2$ is an NPN transistor the application of a positive pulse to the base will drive the circuit into high conduction whereas the application of a negative pulse tends to cut off $T_2$.

As also indicated in Fig. 1 two basic possibilities of output circuits are possible. In one case an output circuit $O_1$ is coupled to the emitter electrode of transistor $T_1$, at which point a relatively low impedance driving source is available. Or an output circuit $O_2$ may be coupled to the emitter of transistor $T_2$ also providing a low impedance driving source.

The invention may be best understood by considering the few specific examples below, where also the operation will be considered in further detail. Reference therefore is made to Fig. 2*a*. Referring now to Fig. 2*a* it is noted that impedances $Ze_1$ and $Ze_2$ appear in the form of resistors $Re_1$ and $Re_2$, respectively. In a similar manner resistors $Rc_1$ and $Rc_2$ are utilized as corresponding collector impedances. Transistors $T_1$ and $T_2$ again are illustrated as of the PNP and NPN types, respectively, and are connected as before with the base electrode of each connected to the collector electrode of the other.

Additional circuitry is also illustrated in Fig. 2*a* for providing an output signal which may be utilized to drive a gating matrix. The output circuit is shown in the form of circuit $O_2$ and includes a capacitor *Co* connected in parallel to emitter resistor $Re_2$. In addition a further transistor is required to discharge capacitor *Co*, as will be described below.

An output signal clamping diode *Do* is included for providing a low impedance charging source for capacitor *Co* when the collector potential of transistor $T_2$ falls below the potential E3 applied to the anode of diode *Do*. It will also be noted that two input diodes are shown for applying positive pulses to trigger the circuit. A first input diode $D_1^1$ passes positive pulses through to the base electrode of transistor $T_2$ driving this transistor into conduction, and a second input diode $D_2^1$ is adapted to pass positive pulses to the base electrode of transistor $T_1$ tending to cut this transistor off.

In order to illustrate the operation it will be assumed that transistors $T_1$ and $T_2$ are non-conducting and transistor $T_3$ provides a low impedance discharging path for output capacitor *Co*. If a positive pulse then is applied to diode $D_1^1$ it passes therethrough and across collector impedance $Rc_1$ and drives transistor $T_2$ into a conducting state. This results in the lowering of the potential at the collector electrode of transistor $T_2$ due to the drop across collector resistor $Rc_2$. This lowered potential results in the forward biasing of transistor $T_1$ and the increased conductance therethrough. The feedback process is then completed when the increased conduction of transistor $T_1$ raises the potential across its collector resistor $Rc_1$, which causes further conduction through transistor $T_2$. Thus the application of a positive pulse through diode $D_1^1$ causes both transistors $T_1$ and $T_2$ to assume a heavy conduction state.

In this state current is drawn through transistor $T_2$ to charge output capacitor *Co* so that it begins to rise in potential. This continues until the point *x* at the junction of $Rc_2$ and $T_2$ becomes sufficiently less than voltage $E_3$ to cause diode *Do* to conduct. When this happens output capacitor *Co* is allowed to charge very rapidly through transistor $T_2$ and diode $D_o$ to the supply voltage +E3.

The flip-flop may then be triggered to the previous state by either applying a negative pulse to the base of transistor $T_2$ or a positive pulse as indicated through diode $D_2^1$ to the base of transistor $T_1$. This then reduces the conduction through transistor $T_1$, and thus the voltage across $Rc_1$, with the result that conduction is reduced through transistor $T_2$ and the feedback process then continues in the reverse direction. When transistor $T_1$ is cut off transistor $T_3$ provides a low impedance discharge path for capacitor $C_o$ as pointed out above.

A circuit similar to that shown in Fig. 2*a* but utilizing transistors of oppositive conductivity type is shown in Fig. 2*b*. Here by way of illustration it is assumed that transistors $T_1$ and $T_2$ are NPN and PNP types, respectively, and are turned on due to the application of a negative pulse through an input diode $D_1^1$ coupled to the base of PNP transistor $T_2$. In a similar manner a negative pulse applied to the base of transistor $T_1$ tends to cut it off and therefore return the circuit to its other state. In other respects the circuit is similar to that of Fig. 2*a* although when transistors $T_1$ and $T_2$ are driven into a high conduction state capacitor $C_o$ is discharged towards a minus potential, the discharging rate being accelerated through diode $D_o$ when the voltage across $Rc_2$ reaches −E3. In other respects the operation of the circuit is similar to that discussed above.

Both of the circuits shown in Figs. 2*a* and 2*b* are somewhat limited in their speed of operation due to the fact that it is necessary to trigger the circuit by cutting off either of transistors $T_1$ or $T_2$. In this case the feedback is less active than it is when the transistors are turned on. It is possible, however, to make both triggering on and off active by effectively combining the two types of current feedback flip-flops shown in Figs. 2*a* and 2*b*. This results in the arrangement of Fig. 3.

In Fig. 3 effectively the upper half of the circuit is similar to Fig. 2*a* and comprises a PNP transistor $T_1$ and an NPN transistor $T_2$ arranged with the base electrode of each connected to the collector electrode of the other. As before resistors $Re_1$ and $Rc_2$ are employed, and a diode $D_o^1$ is employed to apply the potential +E3 to the junction of $Rc_2$ and the collector electrode of $T_2$. Furthermore, output capacitor $C_o$ is connected to the emitter junction of transistors $T_2$ and $T_3$.

In a similar manner the bottom portion of the arrangement is similar to the circuit of Fig. 2*b* where transistors $T_3$ and $T_4$ correspond respectively to transistors $T_2$ and $T_1$ of Fig. 2*b*. Emitter resistor $Re_4$ corresponds to resistor $Re_1$, and collector resistor $Rc_3$ corresponds to resistor $Rc_2$. The important distinction to note is that the collector resistors for $T_1$ and $T_4$ are combined in a common resistor referred to as $Rc1$–$4$, and the emitter resistors for $T_2$ and $T_3$ are combined in a common resistor referenced as $Re_{2-3}$.

In the operation of the embodiment of Fig. 3 either the upper current feedback loop is turned on and the lower feedback is turned off, or the reverse situation occurs. Thus when a positive pulse is applied to input diode $D_1^1$ to the base electrode of transistor $T_2$ it is driven into conduction and transistor $T_1$ is also driven into conduction completing the current feedback loop therein as indicated by the arrow. This cuts off transistor $T_3$ and transistor $T_4$.

In a similar manner the negative pulse application through input diode $D_2^1$ drives transistor $T_3$ into conduction which in turn turns on transistor $T_4$ completing the lower feedback loop and cutting off transistors $T_1$ and $T_2$.

Optional input points are shown in Fig. 3 through positive pulse passing diode $D_3^1$ which will drive transistor $T_4$ into conduction, actuating the lower feedback into conduction loop; and a negative pulse passing input diode $D_4^1$ for passing pulses to the base electrode of transistor $T_1$ actuating the upper feedback loop into conduction. The circuit arrangement of Fig. 3 is illustrated in a practical application in Fig. 4, where it will also be noted that suitable circuit values therefor are shown. It should be noted that all transistor and diode types indicated are specified by either the Texas Instrument Company or General Electric. Referring now to Fig. 4 it will be noted that two feedback transistor flip-flop stages are shown, namely $F_1$ and $F_2$. These stages are coupled by a diode gating circuit to be described which provides positive and negative input pulses for stage $F_2$ when the output signal of stage $F_1$ is high and low, respectively. These signals then are applied to the junction of Texas Instruments NPN type transistor 904, corresponding to transistor $T_4$ in Fig. 3, and General Electric transistor 2N43 corresponding to $T_1$ of Fig. 3. Thus when transistor stage $F_1$ is in a high state, an output capacitor $C_o$ (.0048 microfarad in Fig. 4) is charged to the high level, gating diode $G_1$ is backbiased so that positive clock pulse C(+) may rise to its high level and pass through gating diode $G_2$ and through an input resistor (2K ohms) to the input circuit of flip-flop $F_2$. In a similar manner input signals may be entered into flip-flop stage $F_1$ through gating circuit 10.

From the foregoing description it is apparent that the present invention provides a transistor flip-flop utilizing current feedback to achieve a high degree of current stability. It should now be apparent that the arrangement provided does not require the utilization of the highly sensitive negative resistance characteristic of the transistors and consequently is relatively insensitive to circuit parameter changes.

At the same time the circuit provided is highly sensitive to trigger pulses and provides a high stability while at the same time having a relatively good ability to provide a high load current.

While the invention has been illustrated in but a few forms, it will be understood that the basic concept of current feedback and stabilization through the proper selection of the emitter and collector biasing impedances may be found in a multitude of other forms. Thus it is recognized that those skilled in the art will devise many other variations without departing from the spirit of the present invention.

What is claimed as new, is:

1. A transistor flip-flop circuit including first and second pairs of transistors, said transistors having base, collector, and emitter electrodes, each pair including an NPN transistor and a PNP transistor, the base electrode of each transistor in a pair being coupled to the collector electrode of the other transistor in the pair; emitter impedances coupled to the emitter electrodes of the PNP transistor of said first pair and the NPN transistor of said second pair, respectively; collector impedances coupled to the collector electrodes of the NPN transistor of said first pair and the PNP transistor of said second pair, respectively; a common collector impedance coupled to the junction of the collector electrodes of the PNP transistor in said first pair and the NPN transistor in said second pair; and a common emitter impedance coupled to the junction of the emitter electrodes of the NPN transistor in said first pair and the PNP transistor in said second pair.

2. The transistor trigger circuit defined in claim 1 wherein there is further included an input circuit for applying pulses to the junction of said common collector impedance and the collector electrodes of said PNP transistor in said first pair and the NPN transistor in said second pair, said input circuit being responsive to negative input signals for driving said first pair of transistors into a non-conducting state and said second pair of transistors into a conducting state, and being responsive to positive input pulses for driving said first pair of transistors into a conducting state and said second pair of transistors into a non-conducting state.

3. A flip-flop circuit comprising: first and second transistors of opposite conductivity type, each having a base, an emitter, and a collector; first and second emitter impedances coupled to said emitters and first and second collector impedances coupled to said collectors; means for applying first and second biasing potentials to said first emitter impedance and said second collector impedance, respectively; means for applying first and second reference potentials to said first collector impedance and said second emitter impedance, respectively; said emitter impedances being of substantially smaller magnitude than their associated collector impedances and said biasing potentials being greater than said reference potentials to forward bias the respective transistors during their conducting state; and means connecting the base of each of said transistors to the collector of the other.

4. The flip-flop circuit defined in claim 3 wherein one of said transistors is an NPN type of transistor and the other transistor is a PNP type; and wherein there is further included output circuit means coupled to the emitter electrode of said NPN transistor, said output means including a storage capacitor and an output transistor of the PNP type having its emitter electrode connected to one end of said storage capacitor and its collector electrode coupled to the other end of said storage capacitor, the base electrode of said output transistor being connected to the base electrode of said NPN transistor.

5. The flip-flop circuit defined in claim 3 wherein one of said transistors is a PNP type and the other transistor is a NPN type; and wherein there is further included an output circuit including a storage capacitor and an output transistor of the NPN type, the emitter electrode of said output transistor being coupled to one end of said storage capacitor and the collector electrode of said output transistor being coupled to the other end of said storage capacitor, the base electrode of said storage capacitor being coupled to the base electrode of said PNP transistor.

References Cited in the file of this patent

UNITED STATES PATENTS

| | | |
|---|---|---|
| 2,605,306 | Eberhard | July 29, 1952 |
| 2,622,212 | Anderson | Dec. 16, 1952 |
| 2,655,609 | Shockley | Oct. 13, 1953 |
| 2,666,819 | Raisbeck | Jan. 19, 1954 |
| 2,673,936 | Harris | Mar. 30, 1954 |
| 2,770,732 | Chong | Nov. 13, 1956 |

OTHER REFERENCES

"Electronics," September 1953, Complementary Symmetry, by Robert D. Lohman, pages 140 to 143.